(12) United States Patent
Daggubati

(10) Patent No.: US 11,916,921 B2
(45) Date of Patent: Feb. 27, 2024

(54) SYSTEM FOR PROVIDING A SECURED CONNECTION DURING AN ONLINE MEETING

(71) Applicant: Kishore Daggubati, Danville, CA (US)

(72) Inventor: Kishore Daggubati, Danville, CA (US)

(*) Notice: Subject to any disclaimer, the term of this patent is extended or adjusted under 35 U.S.C. 154(b) by 354 days.

(21) Appl. No.: 17/401,322

(22) Filed: Aug. 13, 2021

(65) Prior Publication Data

US 2021/0377280 A1  Dec. 2, 2021

(51) Int. Cl.
*H04L 9/40* (2022.01)
*G06Q 10/109* (2023.01)
*G06F 16/29* (2019.01)
*H04L 12/18* (2006.01)

(52) U.S. Cl.
CPC ............ *H04L 63/107* (2013.01); *G06F 16/29* (2019.01); *G06Q 10/109* (2013.01); *H04L 63/065* (2013.01); *H04L 63/08* (2013.01); *H04L 63/102* (2013.01); *H04L 12/1818* (2013.01)

(58) Field of Classification Search
CPC ..... H04L 63/107; H04L 63/065; H04L 63/08; H04L 63/102; H04L 12/1818; G06F 16/20; G06Q 10/109

USPC ............................................................ 726/6
See application file for complete search history.

(56) References Cited

U.S. PATENT DOCUMENTS

| | | | | |
|---|---|---|---|---|
| 7,421,469 | B1* | 9/2008 | Liu ..................... | G06Q 10/10 709/204 |
| 2006/0095376 | A1* | 5/2006 | Mitchell ............. | G06Q 10/10 705/50 |
| 2006/0242632 | A1* | 10/2006 | Orsolini ............. | H04L 65/1101 717/140 |
| 2016/0307165 | A1* | 10/2016 | Grødum .............. | G07C 9/21 |
| 2022/0224693 | A1* | 7/2022 | Broadworth ......... | H04L 63/101 |

* cited by examiner

*Primary Examiner* — Michael S McNally

(57) ABSTRACT

The system comprises of a meeting organizer, host data processing system, at least one participant and participant data processing system and a server. The host data processing system is configured to create the meeting, list of participants, generate key for the participants and then communicate the key to the participants. The participant data processing system is configured to receive the credentials, communicate credential and key to the server and communicate the location information of the participant data processing system to the server. The server is configured to authenticate the participant, verify the identity of the participant, and determine whether the participant data processing system is located in a secured or unsecured location.

15 Claims, 11 Drawing Sheets

SYSTEM FOR PROVIDING A SECURED CONNECTION DURING AN ONLINE MEETING

BACKGROUND

Field of Invention

The disclosed subject matter relates to the field of network security. More particularly, but not exclusively, the subject matter relates to providing secured connection during an online meeting.

Discussion of Prior Art

With the ever-increasing internet consumption and improvement in communication systems, video conferencing or an online meeting has aided in connecting people across the globe. Video conferencing has made it possible for a person to connect and communicate with people around the world from the comforts of one's own home. Recent surveys show that the usage of video conferencing to connect with people has skyrocketed and thus has become an indispensable part of life. Video conferencing has found its way into various fields including education, business, healthcare so on and so forth.

Typically, in a video conference, multiple users connect with each other through a central server, wherein plurality of participant data processing systems are in communication with the host data processing system.

However, during an online meeting, security is an important aspect that when neglected can sometimes result in sensitive information being leaked. Unauthorised access of the meeting link and contents thereafter is another issue that needs to be addressed.

In view of the foregoing, it is evident that there is a need for a system that can effectively provide a secured connection for an online meeting.

SUMMARY

A system for providing a secured connection during an online meeting is disclosed. The system comprises a host data processing system, a participant data processing system and a server. The host data processing system is associated with a meeting organizer and comprises a first processor module, a first digital client and a first digital client display interface. The participant data processing system is associated with a participant and comprises a second processor module, a second digital client and a second digital client display interface. The server comprises a database, wherein the server is configured to coordinate a secured connection between the host data processing system and the participant data processing system. The host data processing system is configured to create an online meeting based on an instruction received from the meeting organizer, wherein the host data processing system is configured to add at least one participant to the online meeting, create a list of participants of the online meeting, wherein each of the participants is represented using a unique credential associated with the participant, create a key for participating in the online meeting, and communicate the key with each of the participants of the online meeting, wherein the participant uses the key to participate in the online meeting. The participant data processing system is configured to receive the credential associated with participant of the participant data processing system, communicate the credential and the key with the server, for participating in the online meeting, and communicate a location information of the participating data processing system with the server. The server is configured to authenticate the participant data processing system interacting with the host data processing system, verify the identity of the participant associated with the participant data processing system to determine whether the participant is authorized to participate in the online meeting, and determine whether the participant data processing system is located in a secured location based on the location information of the participant data processing system.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
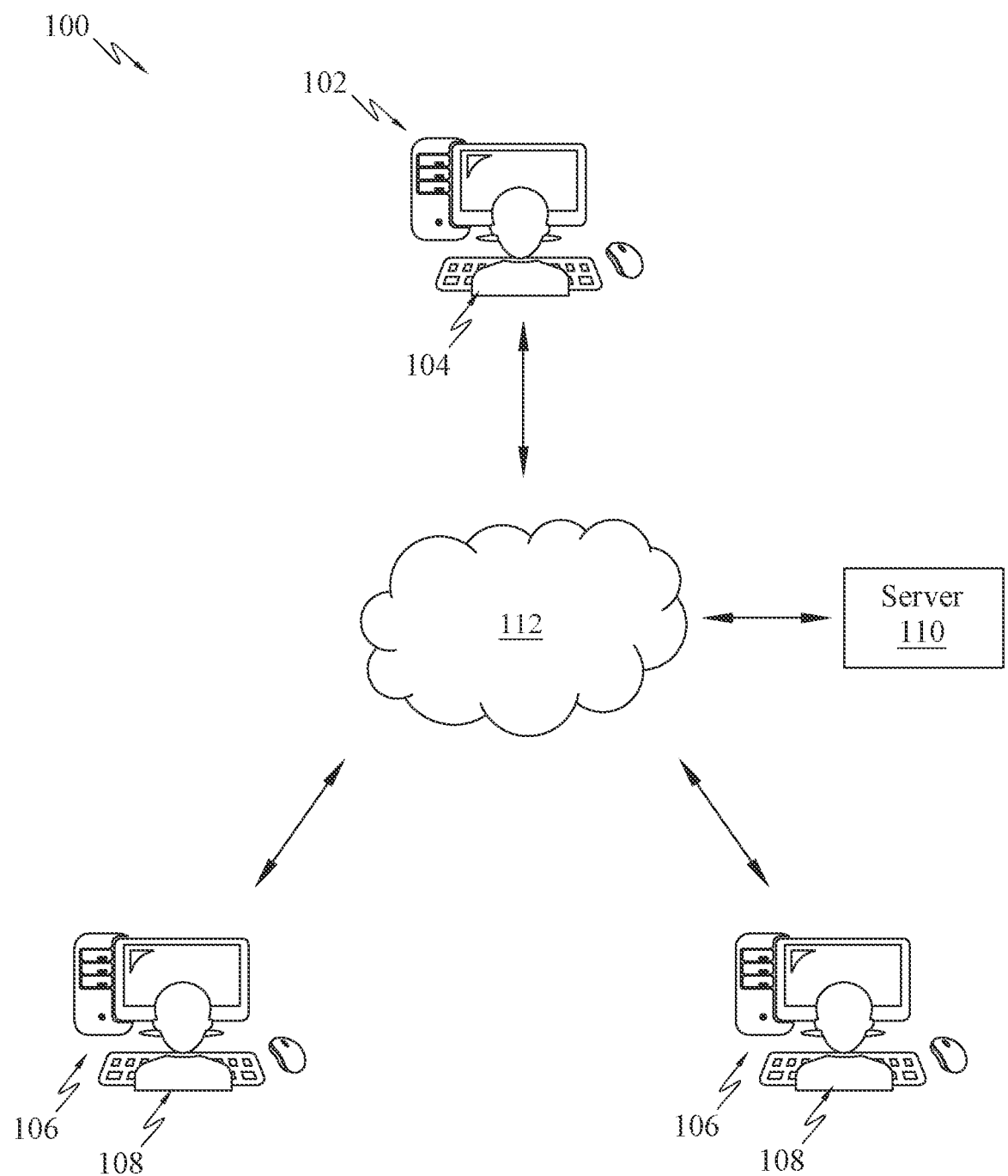
FIG. 1 illustrates a system 100 to provide a secured connection for an online meeting, in accordance with an embodiment.

FIG. 1 illustrates a system 100 to provide a secured connection for an online meeting, in accordance with an embodiment. The system 100 may comprise a host data processing system 102, wherein the host data processing system 102 is associated with a meeting organizer 104, at least one participant data processing system 106, wherein the participant data processing system 106 is associated with a participant 108, and a server 110, wherein the server 110 is configured to coordinate a secured connection between the host data processing system 102 and the participant data processing system 106. The host data processing system 102, participant data processing system 106 and the server 110 may further be connected and communicate with each other through a network 112. The network 112 may be a local area network, wide area network or a metropolitan area network.

Figure 2:
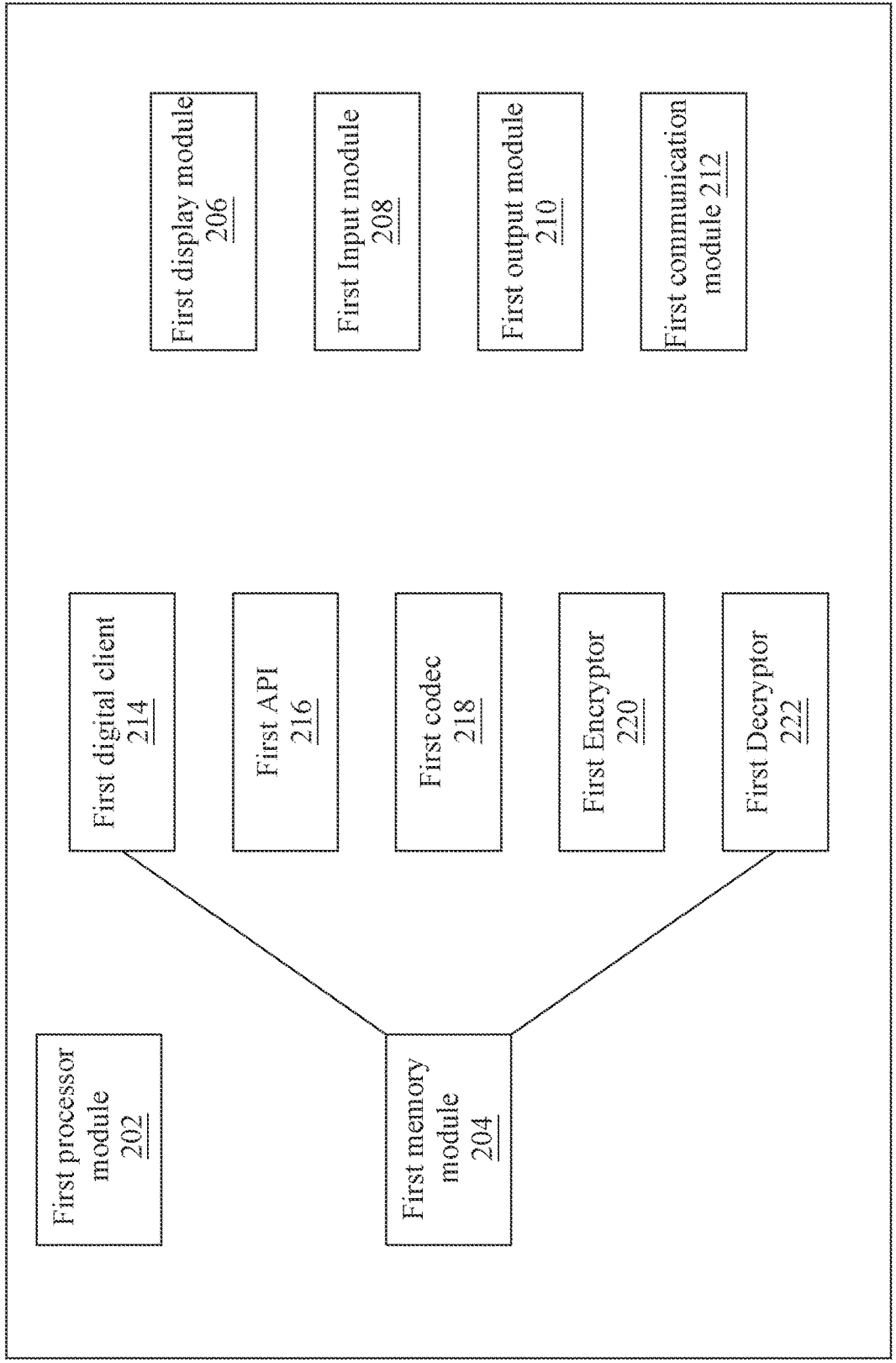
FIG. 2 is a block diagram illustrating a host data processing system 102, in accordance with an embodiment.

FIG. 2 is a block diagram illustrating a host data processing system 102, in accordance with an embodiment. The host data processing system 102 may comprise a first processor module 202, a first memory module 204, a first display module 206, first input modules 208, first output modules 210 and a first communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The first memory module 204 may include a permanent memory such as hard disk drive, may be configured to store data, and executable program instructions that are implemented by the processor module. The first memory module 204 may be implemented in the form of a primary and a secondary memory. The first memory module 204 may store additional data and program instructions that are loadable and executable on the first processor module 202, as well as data generated during the execution of these programs. Further, the first memory module 204 may be a volatile memory, such as random-access memory and/or a disk drive, or a non-volatile memory. The first memory module 204 may comprise of removable memory such as a Compact Flash card, Memory Stick, Smart Media, Multimedia Card, Secure Digital memory, or any other memory storage that exists currently or may exist in the future.

In an embodiment, the first memory module 204 may further comprise a first digital client 214, a first Application Programming Interface (API) 216, a first codec 218, a first encryptor 220 and a first decryptor 222. The first digital client 214 may be a web browser or a software application enabling multiple screen sharing simultaneously, wherein the first digital client 214 may further comprise a first digital client display interface. The first digital client interface may enable the interaction of the meeting organizer 104 with the host data processing system 102. The first codec 218 may include computer-executable or machine-executable instructions written in any suitable programming language to compress outgoing data and decompress incoming data. The first encryptor 220 may encrypt the data being sent and first decryptor 222 may decrypt the incoming data.

The first display module 206 may display an image, a video, or data to a user. For example, the first display module 206 may include a panel, and the panel may be an LCD, LED or an AM-OLED.

The first input module 208 may provide an interface for input devices such as keypad, touch screen, mouse and stylus among other input devices. In an embodiment, the first input module 208 includes a camera and a microphone.

The first output module 210 may provide an interface for output devices such as display screen, speakers, printer and haptic feedback devices, among other output devices.

The first communication module 212 may be used by the host data processing system 102 to communicate with the server 110. The first communication module 212, as an example, may be a GPRS module, or other modules that enable wireless communication.

Figure 3:
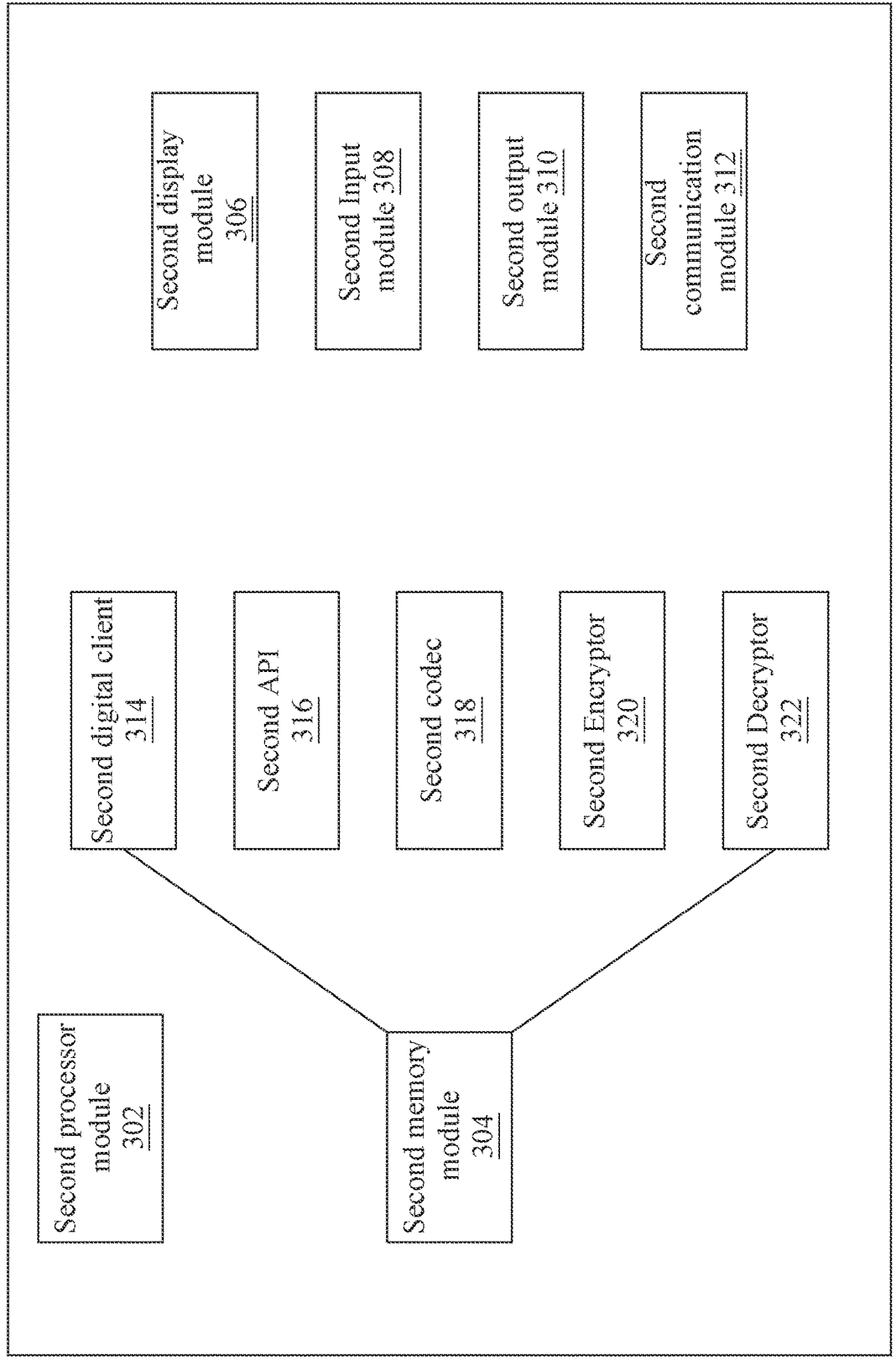
FIG. 3 is a block diagram illustrating a participant data processing system 106, in accordance with an embodiment.

FIG. 3 is a block diagram illustrating a participant data processing system 106, in accordance with an embodiment. The participant data processing system 106 may comprise a second processor module 302, a second memory module 304, a second display module 306, second input modules 308, second output modules 310 and a second communication module 312.

It may be noted that the participant data processing system 106, may have a similar architecture as that of the host data processing system 102.

Figure 4:
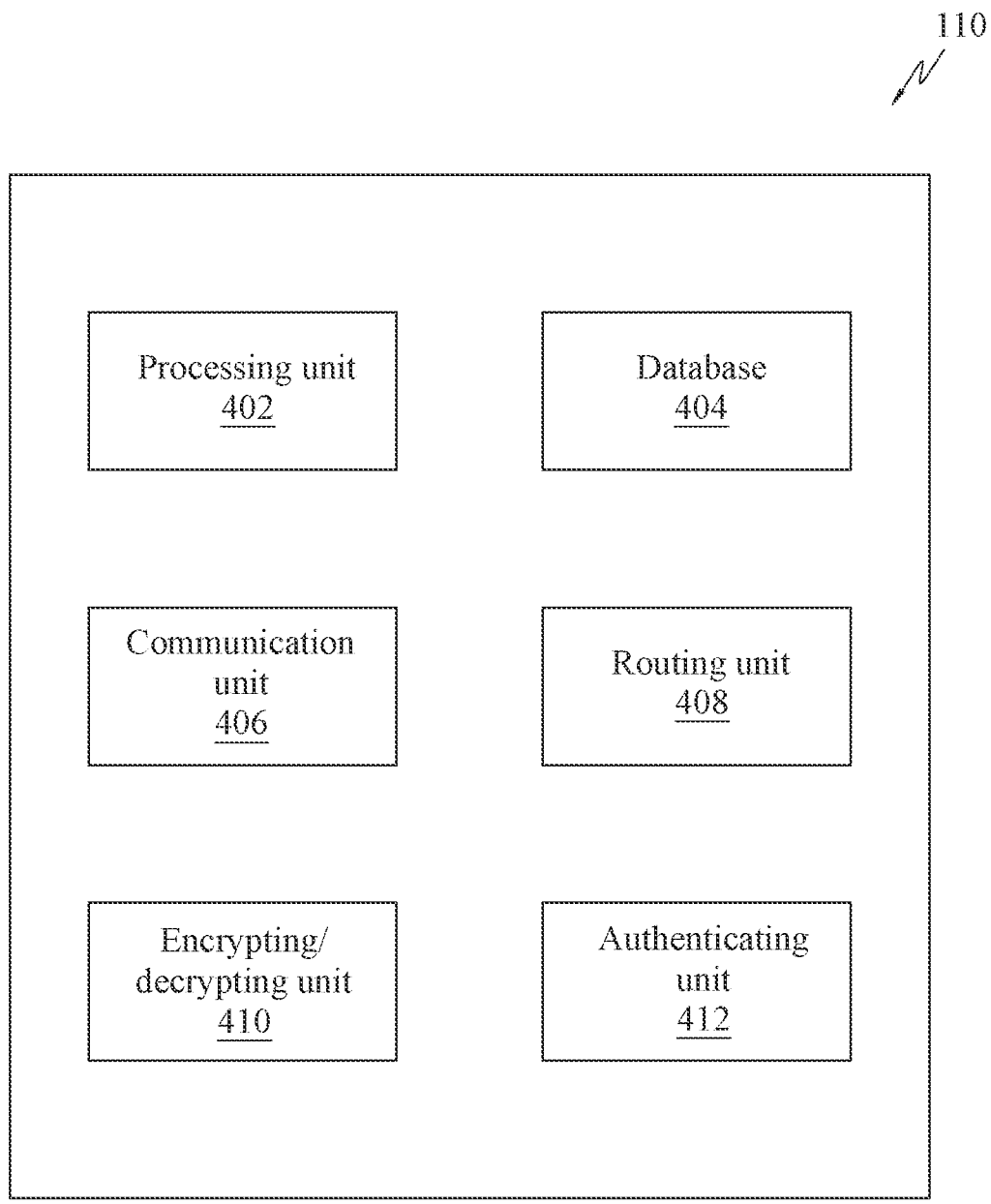
FIG. 4 is a block diagram illustrating the architecture of a server 110, in accordance with an embodiment.

FIG. 4 is a block diagram illustrating the architecture of a server 110, in accordance with an embodiment. The server 110 may comprise a processing unit 402, a database 404, a communication unit 406, a routing unit 408, an encrypting/decrypting unit 410 and an authenticating unit 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The database 404 may include a permanent memory such as hard disk drive, may be configured to store data, and executable program instructions that are implemented by the processor module. In one embodiment, the database 404 may be configured to store information related to the host and the participants 108 which may not be limited to email ID, phone number, historical location information pertaining to the participant data processing system 106, list of participants 108 of the online meeting created by the host data processing system 102 and so on.

The communication unit 406 may be used by the remote server 110 to communicate with the host data processing system 102 and the plurality of participant data processing systems 106. The communication unit 406, as an example, may be a GPRS module, or other modules that enable wireless communication.

The routing unit 408 may enable identification of data processing systems to which the data must be transmitted.

The encrypting/decrypting unit 410 may encrypt the incoming data from each of the data processing systems and decrypt the outgoing data from the server 110.

The authenticating unit 412 may authenticate each of the participants 108 associated with the participant data processing systems 106 before establishing a connection.

Figure 5A:
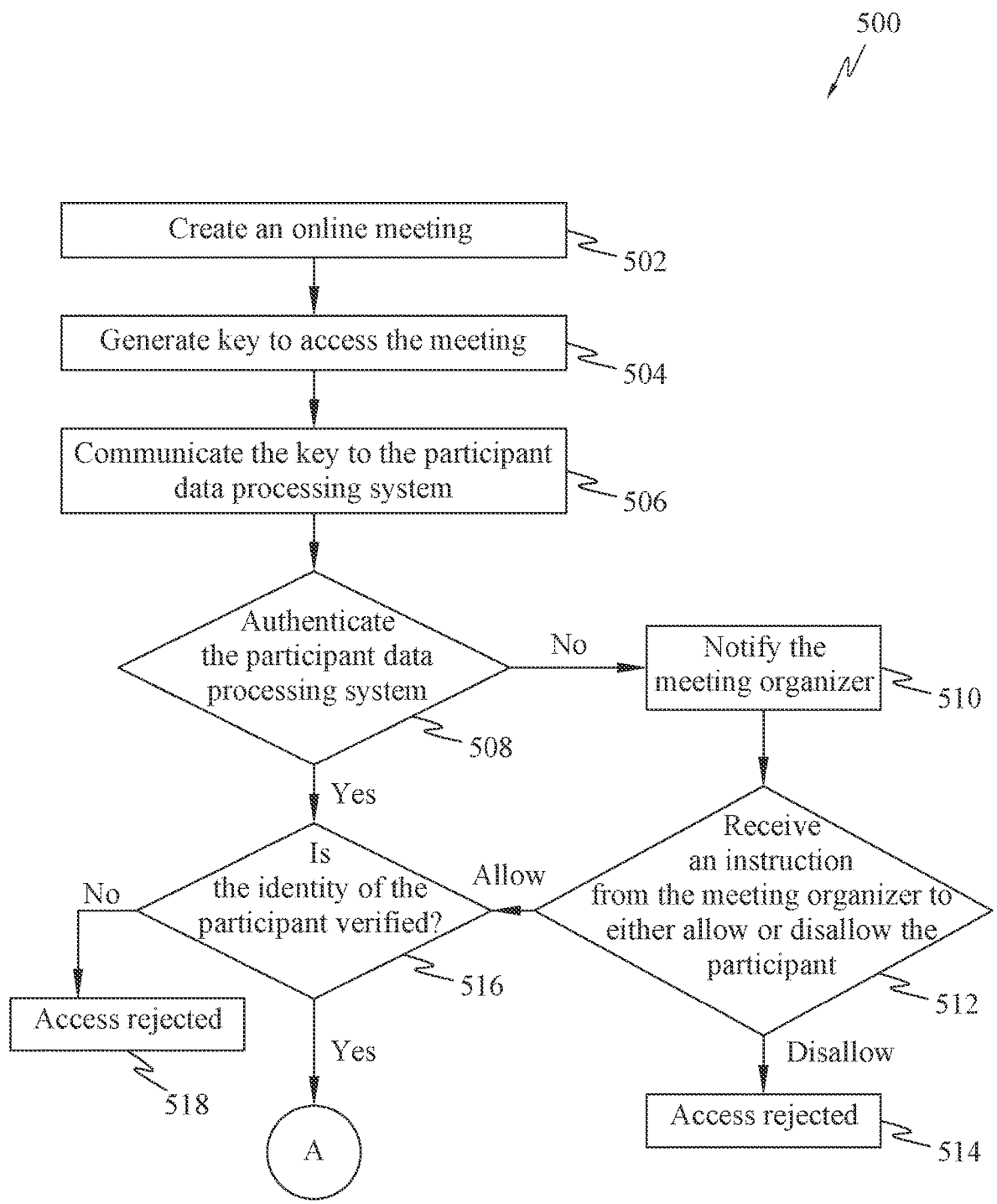
FIGS. 5A and 5B is a flowchart 500 illustrating the working of the system 100, in accordance with an embodiment.
Figure 5B:
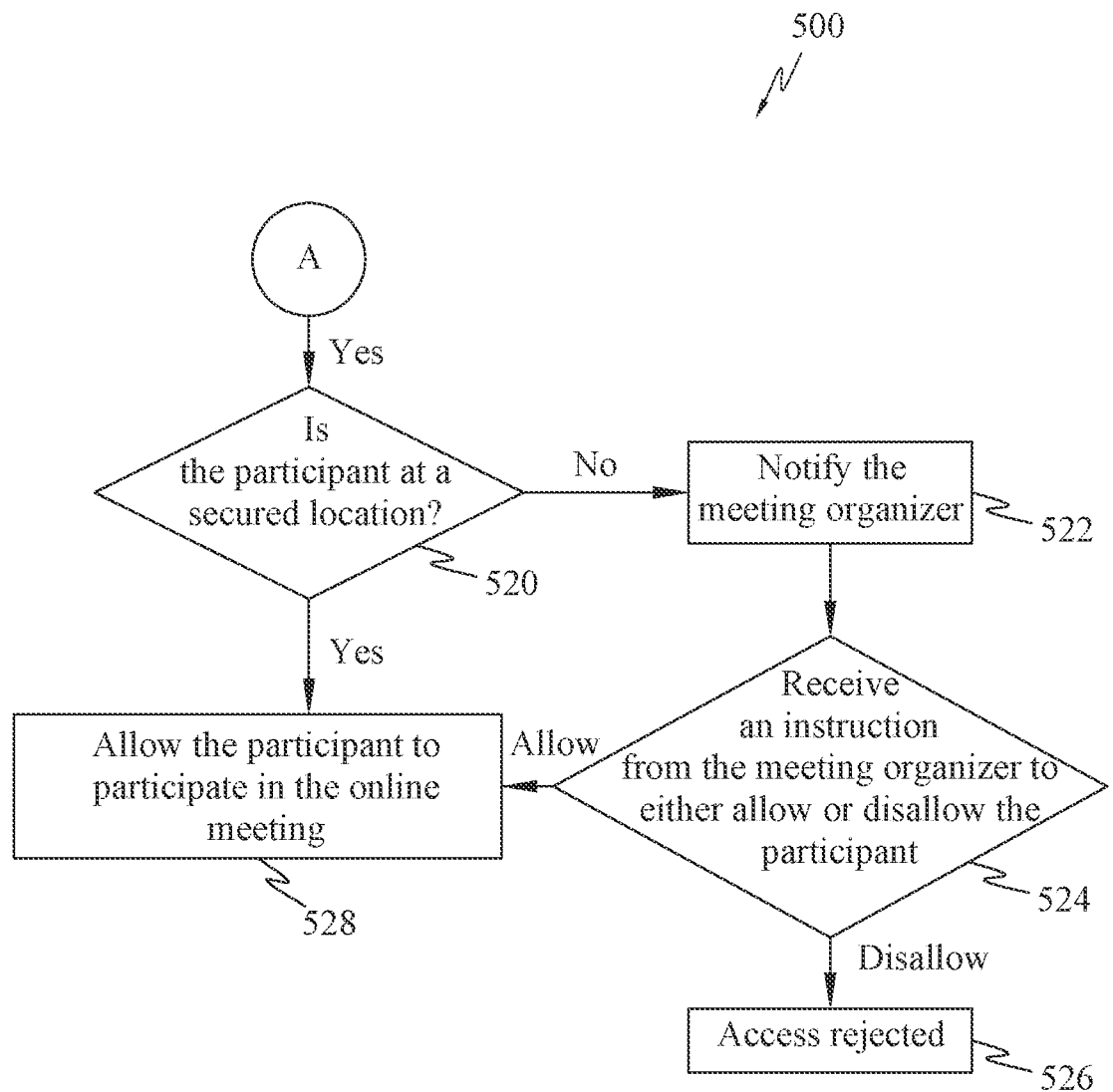

FIGS. 5A and 5B are a flowchart 500 illustrating the working of the system 100, in accordance with an embodiment. At step 502, the meeting organizer 104 may create an online meeting by providing instructions to the system 100 via the host data processing system 102.

At step 504, the system 100 may generate a key to participate in the online meeting. At step 506, the system 100 may communicate the generated key to the participants 108. The participant 108 may use the received key to participate in the online meeting.

At step 508, the server 110 may authenticate the participant data processing system 106 by comparing the credentials and key received with the predetermined participant 108 list present in the database 404.

If the participant data processing system 106 is not authenticated, then at step 510, the server 110 may notify the meeting organizer 104 that the participant data processing system 106 is not authenticated.

At step 512, the server 110 may receive an instruction from the meeting organizer 104 to either allow or not allow the participant 108 to connect with the host data processing system 102.

If the meeting organizer 104 disallows the participant 108 to connect with the host data processing system 102, then at step 514, the participant 108 may be denied access to the online meeting.

If the meeting organizer 104 allows the participant 108 to connect with the host data processing system 102, the server 110 may proceed to step 516.

If the participant data processing system 106 is authenticated, then at step 516, the server 110 may verify the identity of the participant 108 to determine whether the participant 108 is authorized to participate in the online meeting.

If the identity of the participant 108 is not verified, then at step 518, the server 110 may deny the participant 108 the access to the meeting.

If the identity of the participant 108 is verified, then at step 520, the server 110 may determine whether the participant data processing system 106 is in a secured location or an unsecured location.

If the participant data processing system 106 is located in an unsecured location, the server 110, at step 522, may notify the meeting organizer 104 that the participant data processing system 106 is in an unsecured location.

At step 524, the server 110 may receive an instruction from the meeting organizer 104 to either allow or not allow the participant 108 to connect with the host data processing system 102.

If the meeting organizer 104 disallows the participant 108 to connect with the host data processing system 102, then at step 526, the participant 108 may be denied access to the online meeting.

If the meeting organizer 104 allows the participant 108 to connect with the host data processing system 102, the server 110 may allow the participant 108 to participate in the online meeting.

If the participant data processing system 106 is located in a secured location, the server 110, at step 528, may allow the participant 108 to participate in the online meeting.

Figure 6:
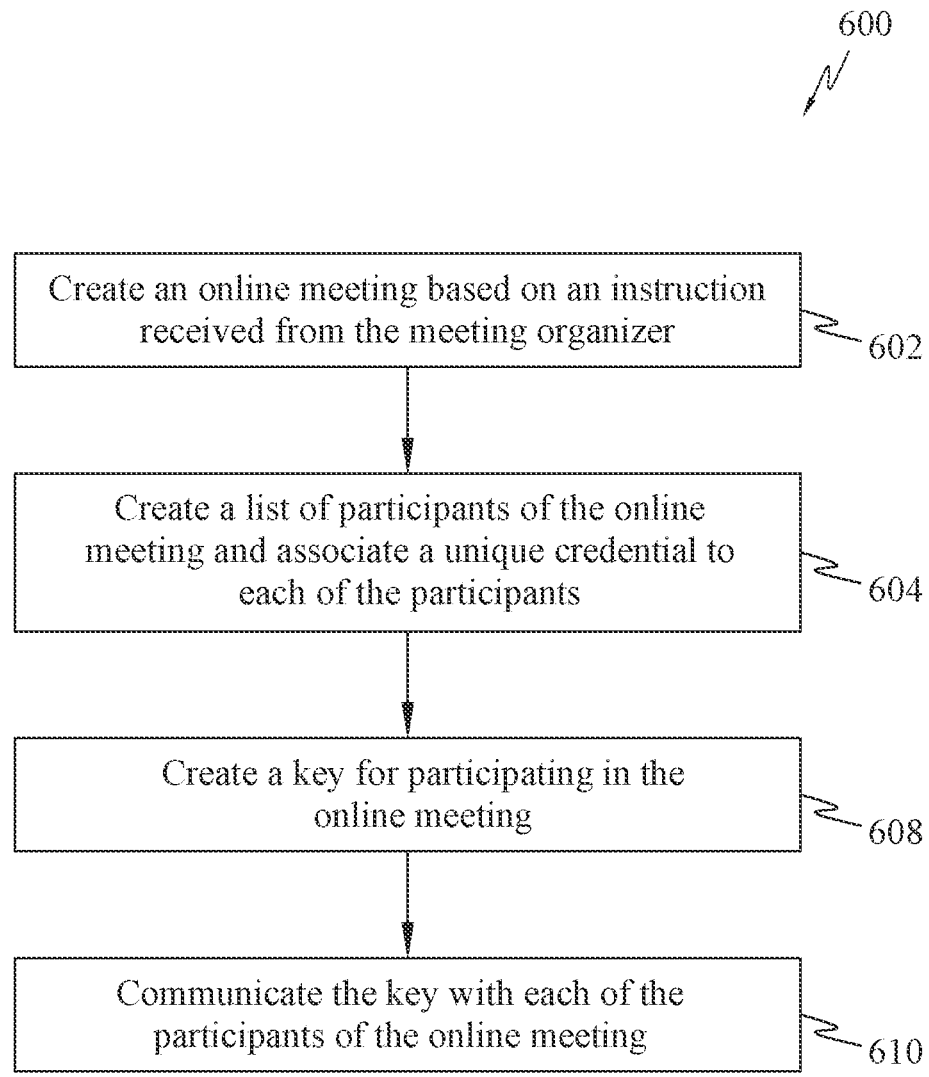
FIG. 6 is a flowchart 600 of creation of an online meeting by the host data processing system 102 when instructed by the meeting organizer 104, in accordance with an embodiment.

FIG. 6 is a flowchart 600 of creation of an online meeting by the host data processing system 102 when instructed by the meeting organizer 104, in accordance with an embodiment. At step 602, the host data processing system 102 may create an online meeting based on an instruction received from the meeting organizer 104, wherein the host data processing system 102 is configured to add at least one participant 108 to the online meeting.

At step 604, the host data processing system 102 may create a list of participants 108 of the online meeting, wherein each of the participants 108 is represented using a unique credential associated with the participant 108.

In one embodiment, the unique credential may be an email address associated with the participant 108.

In one embodiment, the created list of participants 108 may be stored in the database 404 of the server 110.

At step 606, the host data processing system 102 may create a key for participating in the online meeting.

In one embodiment, the key created by the host data processing system 102 may be unique to each of the participants 108 of the online meeting.

In one embodiment, the key created by the host data processing system 102 may be unique to each online meeting.

At step 608, the host data processing system 102 may communicate the key with each of the participants 108 of the online meeting, wherein the participant 108 uses the key to participate in the online meeting.

Figure 7:
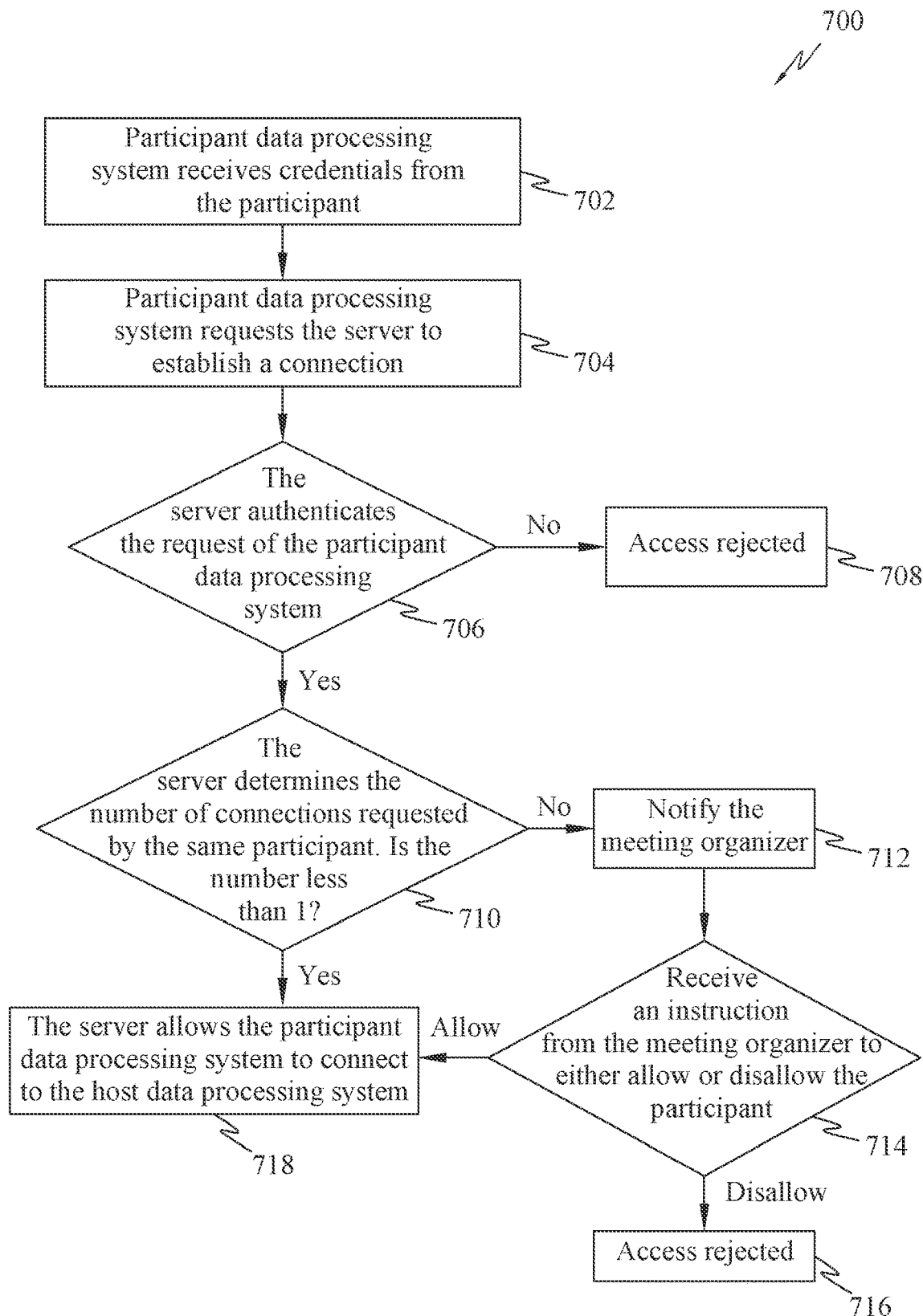
FIG. 7 is a flowchart 700 illustrating the authentication process of the system 100, in accordance with an embodiment.

FIG. 7 is a flowchart 700 illustrating the authentication process of the system 100, in accordance with an embodiment. At step 702, the participant data processing system 106 may receive the credential associated with the participant 108 of the participant data processing system 106.

At step 704, the participant data processing system 106 may communicate the credential and the key with the server 110, to participate in the online meeting.

At step 706, the server 110 may authenticate the request of the participant data processing system 106. As an example, the server 110 may verify the participant's 108 credentials and key to authenticate the participant data processing system 106.

If the credentials and the key does not match the predetermined credentials and the key stored in the database 404 for individual participant 108, the server 110, at step 708, may deny access to the participant data processing system 106.

If the credentials and the key received from the participant data processing system 106 match the predetermined credentials and the key stored in the database 404, then at step 710, the server 110 may determine whether the participant 108 tries connecting through multiple participant data processing systems 106. The server 110 may be configured to detect multiple connections from the same participant 108.

If the server 110 detects multiple participant data processing systems 106 attached to a single participant 108, at step 712, the server 110 may be configured to notify the meeting organizer 104.

At step 714, the server 110 may be configured to receive an instruction from the meeting organizer 104 to either allow or disallow the multiple participant data processing systems 106.

At step 716, the server 110 may deny access to the participant data processing system 106.

If the participant 108 connects to the server 110 from a single participant data processing system 106, then at step 718, and the server 110 may allow the participant 108 to connect with the server 110.

Figure 8:
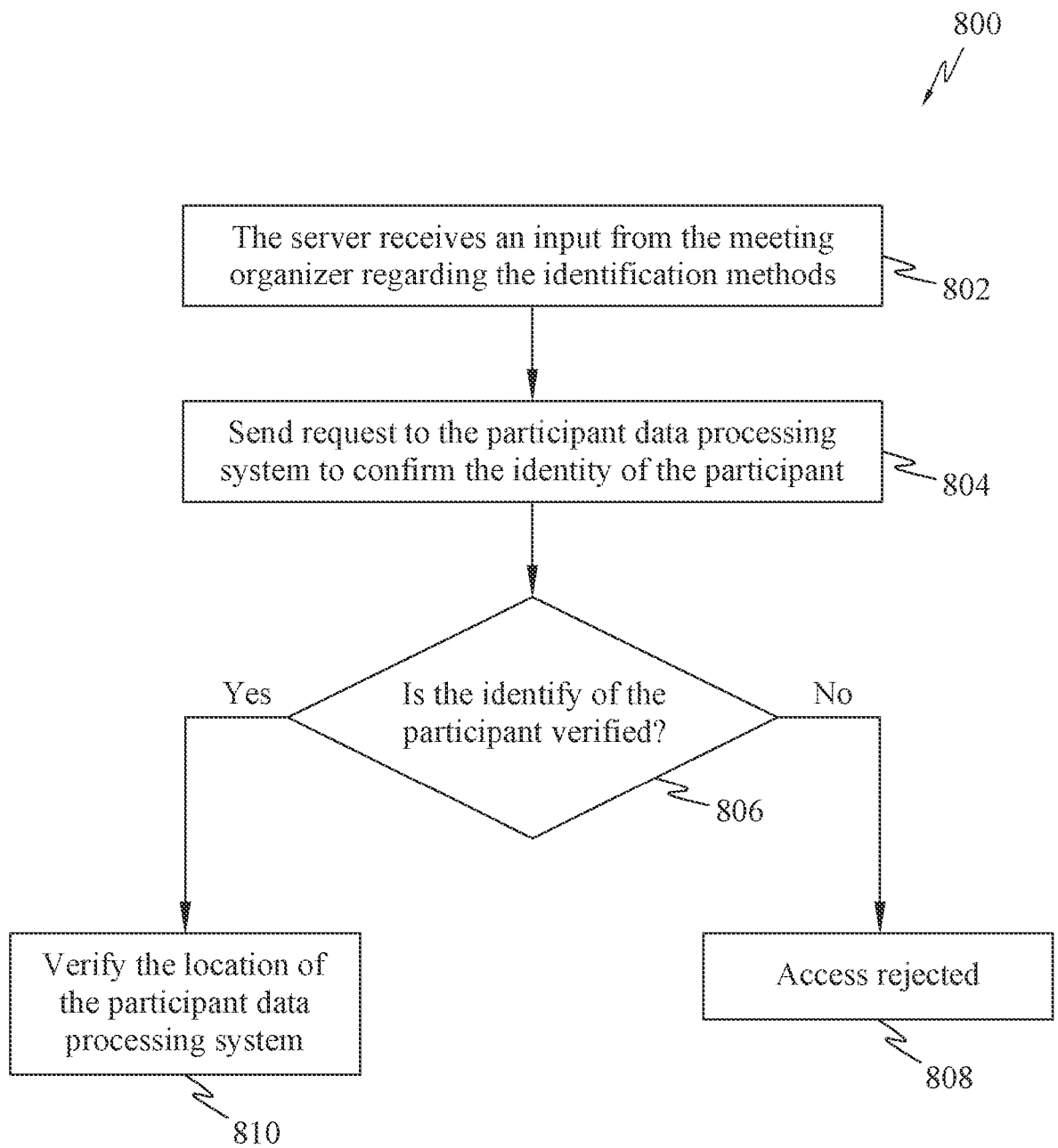
FIG. 8 is a flowchart 800 illustrating the identification process performed by the server 110, in accordance with an embodiment.

FIG. 8 is a flowchart 800 illustrating the identification process performed by the server 110, in accordance with an embodiment. Each participant 108 related to each participant data processing system 106 is requested by the server 110 to identify themselves. The server 110 may be configured to request the meeting organizer 104 to choose the number of times each participant 108 has to identify themselves. At step 802, the server 110 may receive an input from the meeting organizer 104 regarding the identification methods that are to employed.

In one embodiment, the meeting organizer 104 may provide number of identification processes and methods of identification to be used for verifying the identity of the participant 108. As an example, the meeting organizer 104 may select two methods of identification, viz., OTP verification and email address verification.

In one embodiment, the server 110 may be configured to perform at least one step identification from the identification process list. Identification process list may include but not limited to biometric identification system 100, one time password (OTP) system 100, face recognition system 100 and so on.

In one embodiment, the server 110 may verify whether the credential and the key received from the participant 108 is present in the list of participants 108 of the online meeting that is stored in the database 404 of the server 110.

At step 804, the server 110 may send a request to the participant data processing system 106 to confirm the identity of the participant 108.

If the identity of the participant 108 is not verified, at step 806, the server 110 may deny access to the participant 108.

If the server 110 confirms the identity of the participant 108, at step 810, the server 110 may proceed with verifying the location of the participant data processing system 106.

The server 110 may repeat steps 804 to 810 for each of the selected identification methods.

Figure 9:
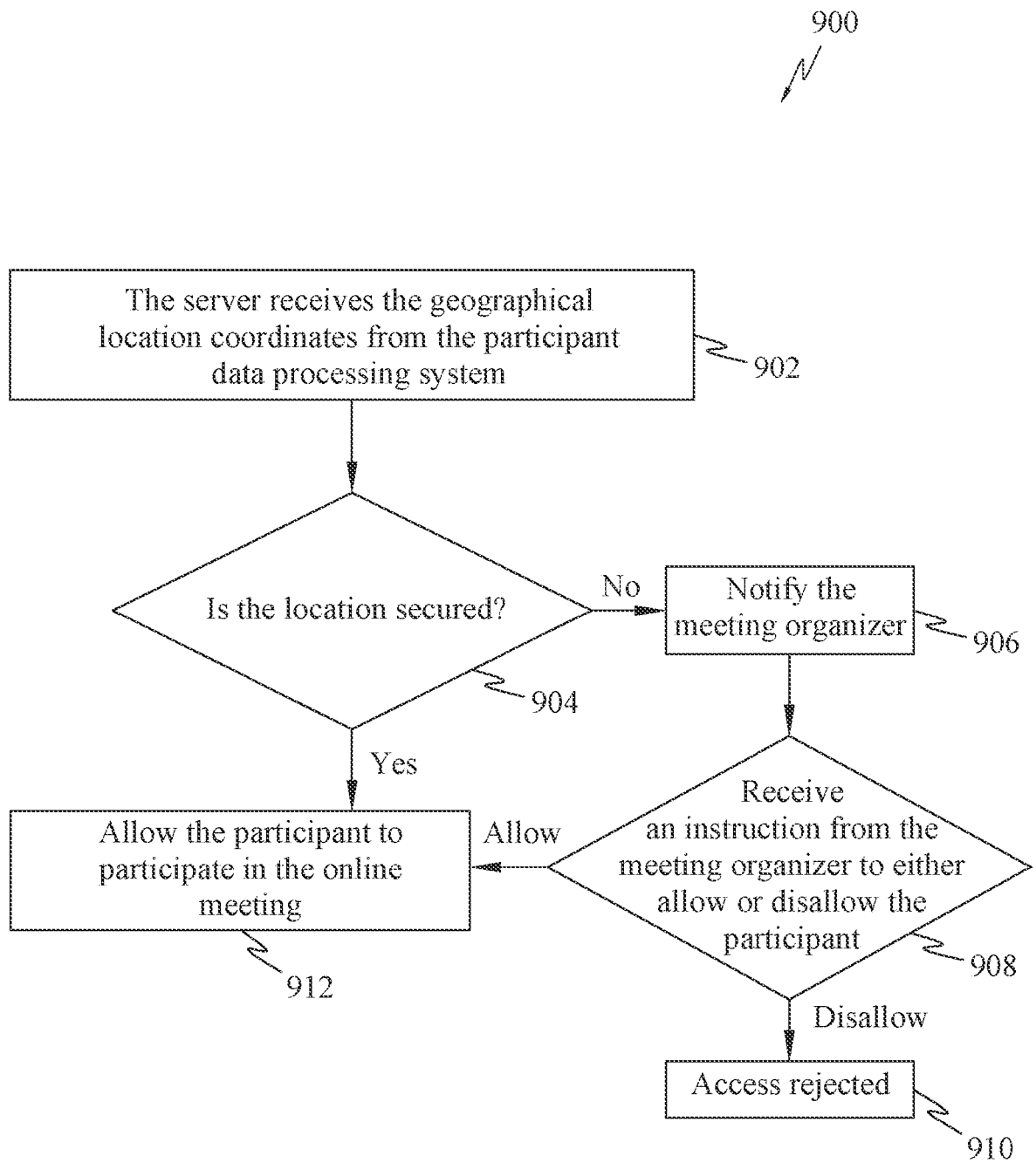
FIG. 9 is a flowchart 900 illustrating the process of determination of the location of the participant data processing system 106, according to one embodiment.

FIG. 9 is a flowchart 900 illustrating the process of determination of the location of the participant data processing system 106, according to one embodiment. At step 902, the server 110 may be configured to receive the geographical location coordinates of the participant data processing system 106.

At step 904, the server 110 may determine whether the participant data processing system 106 is in a secured location or an unsecured location based on the geographic coordinates received from the participant data processing system 106. As an example, if the geographical coordinates of the location of the participant data processing system 106 falls at a park, the server 110 will classify the location as an unsecured location as opposed to when the participant data processing system 106 is located in a residential area, then the server 110 may determine that the participant data processing system 106 is at a secured location.

In one embodiment, the database 404 may comprise a map data, wherein the map data comprises an information whether the location corresponding to a geographical coordinate is a secured or unsecured location. The server 110 may determine whether the participant data processing system 106 is in a secured location or an unsecured location using the map data.

In one embodiment, the server 110 may further comprise a map application programming interface, wherein the map application programming interface may be configured to receive the geographical coordinates of the participant data processing system 106 based on the location information. Additionally, the map application programming interface may be configured to determine whether the location corresponding to a geographical coordinates of the participant data processing system 106 is a secured or unsecured location based on the map data. For example, when the participant data processing system 106 is connected to the server 110 through a network 112 that is located at or around a park according to the map data, then the server 110 may classify the location as an unsecured location. On the other hand, if the participant data processing system 106 is connected to the server 110 through a network 112 which is located in a residential area according to the map data, then the server 110 may classify the location as a secured location.

If the participant data processing system 106 is located in an unsecured location, at step 906, the server 110 may send a notification to the meeting organizer 104, requesting for additional instructions.

At step 908, the server 110 may receive an instruction from the meeting organizer 104 to either allow or disallow the participant 108.

If the participant 108 is disallowed, at step 910, the server 110 may deny access to the participant 108.

If the participant 108 is allowed, then at step 912 the server 110 may allow the participant data processing system 106 to connect with the host data processing system 102.

If the server 110 at step 904, determines that the participant data processing system 106 is located in a secured location, at step 912, the server 110 may allow the participant data processing system 106 to connect with the host data processing system 102.

Figure 10:
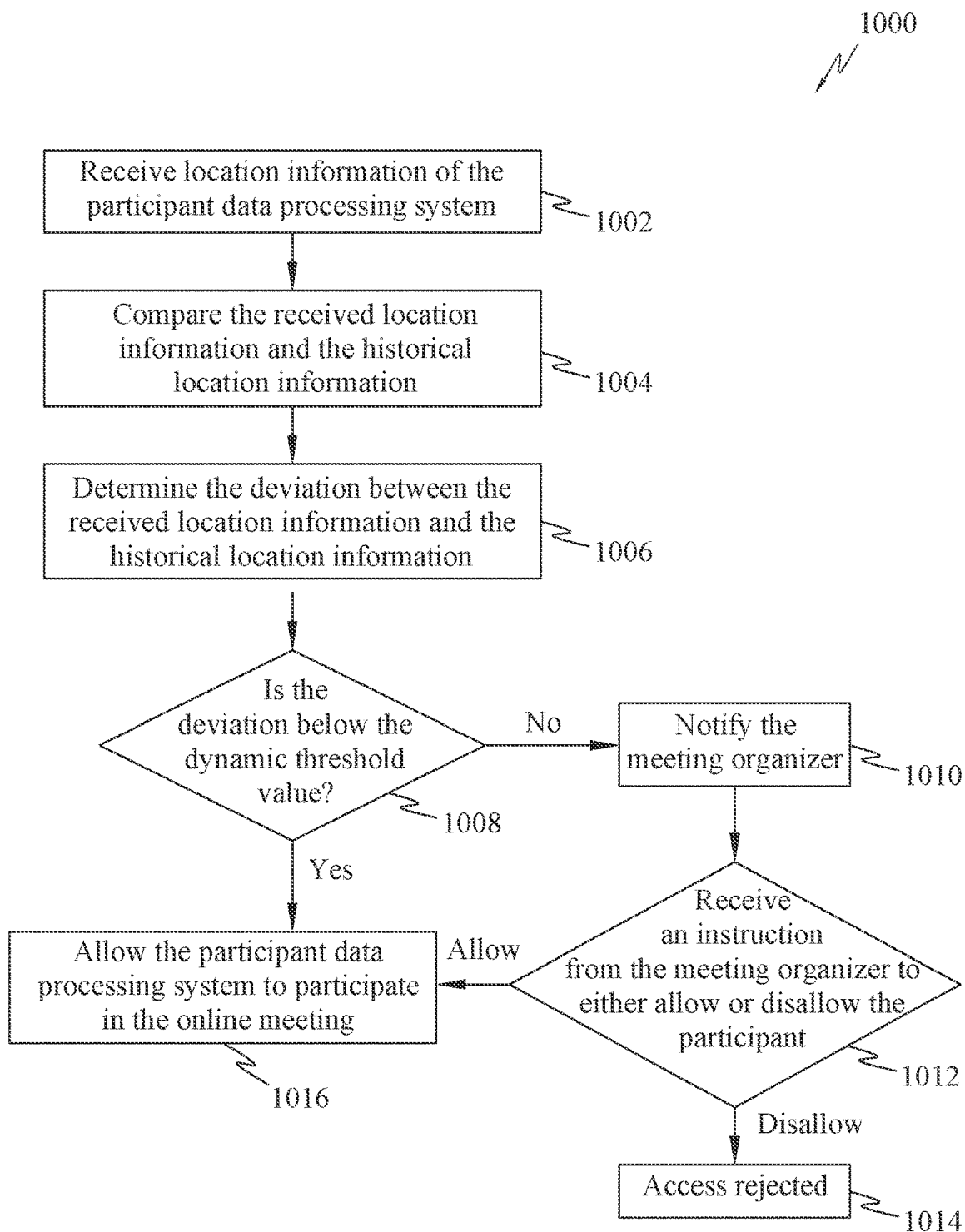
FIG. 10 is a flowchart 1000 illustrating a process for determining the deviation in the participant's 108 location compared to the last known location details of the same participant 108, according to one embodiment.

FIG. 10 is a flowchart 1000 illustrating a process for determining the deviation in the participant's 108 location compared to the last known location details of the same participant 108, according to one embodiment. At step 1002, the server 110 may be configured to receive the details regarding the geographical location coordinates of the participant data processing system 106.

At step 1004, the server 110 may compare the received location details of the participant data processing system 106 and the historical location information of the participant data processing system 106.

In one embodiment, the database 404 may comprise a historical location information pertaining to the participant data processing system 106.

At step 1006, the server 110 may be configured to determine whether a deviation between the received location details of the participant data processing system 106 and the historical location details of the participant data processing system 106.

At step 1008, the server 110 may determine whether the deviation between the received location details of the participant data processing system 106 and the historical location details of the participant data processing system 106 is below a predetermined dynamic threshold value.

If the deviation is less than the predetermined dynamic threshold value, then at step 1016, the server 110 may allow the participant data processing system 106 to participate in the online meeting. As an example, if the participant 108 tries to connect with the host data processing system 102 using participant data processing system 106 from New Delhi at noon and then the same participant data processing system 106 connects from New York at around 1:00 AM, the server 110 may notify the meeting organizer 104, that the deviation in location calculated from the location coordinates received has exceeded the predetermined dynamic threshold value.

If the deviation is greater than the predetermined dynamic threshold value, then at step 1010, the server 110 may further be configured to notify the meeting organizer 104 via the host data processing system 102.

At step 1012, the server 110 may receive an instruction from the meeting organizer 104 to either allow or disallow the participant 108.

At step 1014, if the meeting organizer 104 disallows the participant data processing system 106, the server 110 may deny access to the participant data processing system 106.

If the meeting organizer 104 allows the participant data processing system 106, the server 110, at step 1016, may allow the participant data processing system 106 to join the online meeting.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system 100 and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for providing a secured connection during an online meeting, the system comprising:
   a host data processing system, wherein the host data processing system is associated with a meeting organizer and comprises a first processor module, a first digital client and a first digital client display interface;
   at least one participant data processing system, wherein the participant data processing system is associated with a participant and comprises a second processor module, a second digital client and a second digital client display interface; and
   a server comprising a database, wherein the server is configured to coordinate a secured connection between the host data processing system and the participant data processing system;
   wherein,
   the host data processing system is configured to:
      create an online meeting based on an instruction received from the meeting organizer, wherein the host data processing system is configured to add at least one participant to the online meeting;
      create a list of participants of the online meeting, wherein each of the participants is represented using a unique credential associated with the participant;
      create a key for participating in the online meeting; and
      communicate the key with each of the participants of the online meeting, wherein the participant uses the key to participate in the online meeting;
   the participant data processing system is configured to:
      receive the credential associated with participant of the participant data processing system;
      communicate the credential and the key with the server, for participating in the online meeting; and
      communicate a location information of the participating data processing system with the server;
   the server is configured to:
      authenticate the participant data processing system interacting with the host data processing system;
      verify the identity of the participant associated with the participant data processing system to determine whether the participant is authorized to participate in the online meeting;
      determine whether the participant data processing system is located in a secured location based on the location information of the participant data processing system; and
      determine geographical coordinates of the participant data processing system based on the location information received from the participant data processing system.

2. The system of claim 1, wherein the key created by the host data processing system is unique to each of the participants of the online meeting.

3. The system of claim 2, wherein the server is configured to notify the host data processing system if one of the participants of the online meeting connects to host data processing system using multiple participant data processing systems based on the credential associated with the participant.

4. The system of claim 3, wherein the host data processing system is configured to:
   receive an instruction from the meeting organizer to either allow or not allow the participant to connect with the host data processing system using multiple participant data processing systems.

5. The system of claim 1, wherein the database comprises a map data, wherein the map data comprises an information whether the location corresponding to the geographical coordinate is a secured or unsecured location.

6. The system of claim 5, wherein the server comprises a map application programming interface configured to:
   receive the geographical coordinates of the participant data processing system based on the location information; and
   determine whether the location corresponding to a geographical coordinates of the participant data processing system is a secured or unsecured location based on the map data.

7. The system of claim 6, wherein the server is configured to notify the meeting organizer via the host data processing system if the participant data processing system is located in an unsecured location.

8. The system of claim 7, wherein the host data processing system is configured to:
   receive an instruction from the meeting organizer to either allow or disallow the participant connecting with the host data processing system using the participant data processing system located in an unsecured location.

9. The system of claim 1, wherein the database comprises a historical location information pertaining to the participant data processing system.

10. The system of claim 9, wherein the server is configured to:
   compare the received location information of the participant data processing system and the historical location information of participant data processing system;
   determine whether there is a deviation between the received location information of the participant data processing system and the historical location information of participant data processing system; and notify the meeting organizer via the host data processing system if the deviation exceeds a predetermined dynamic threshold value.

11. The system of claim 10, wherein the host data processing system is configured to:

receive an instruction from the meeting organizer either to allow or disallow participant if the deviation between the received location information of the participant data processing system and the historical location information of participant data processing system exceeds a predetermined threshold value.

12. The system of claim 1, wherein the server is configured to:

receive an instruction from the meeting organizer via the host data processing system, for addition of an identification process for verifying the identity of the participant.

13. The system of claim 1, wherein the database is configured to store the list of participants of the online meeting created by the host data processing system.

14. The system of claim 13, wherein the server is configured to:

receive the credential and the key associated with the participant from the participant via the participant data processing system;

verify whether the credential of the participant is present in the list of participants of the online meeting;

allow the participant data processing system to connect with the host data processing system, if the credential of the participant is present in the list of participants of the online meeting; and disallow the participant data processing system to connect with the host data processing system, if the credential of the participant is not present in the list of participants of the online meeting.

15. The system of claim 1, wherein the key created by the host data processing system is unique to each online meeting created.

* * * * *